No. 773,529. PATENTED OCT. 25, 1904.
G. O. SEWARD.
METHOD OF CARBON ANALYSIS.
APPLICATION FILED FEB. 25, 1903.
NO MODEL.
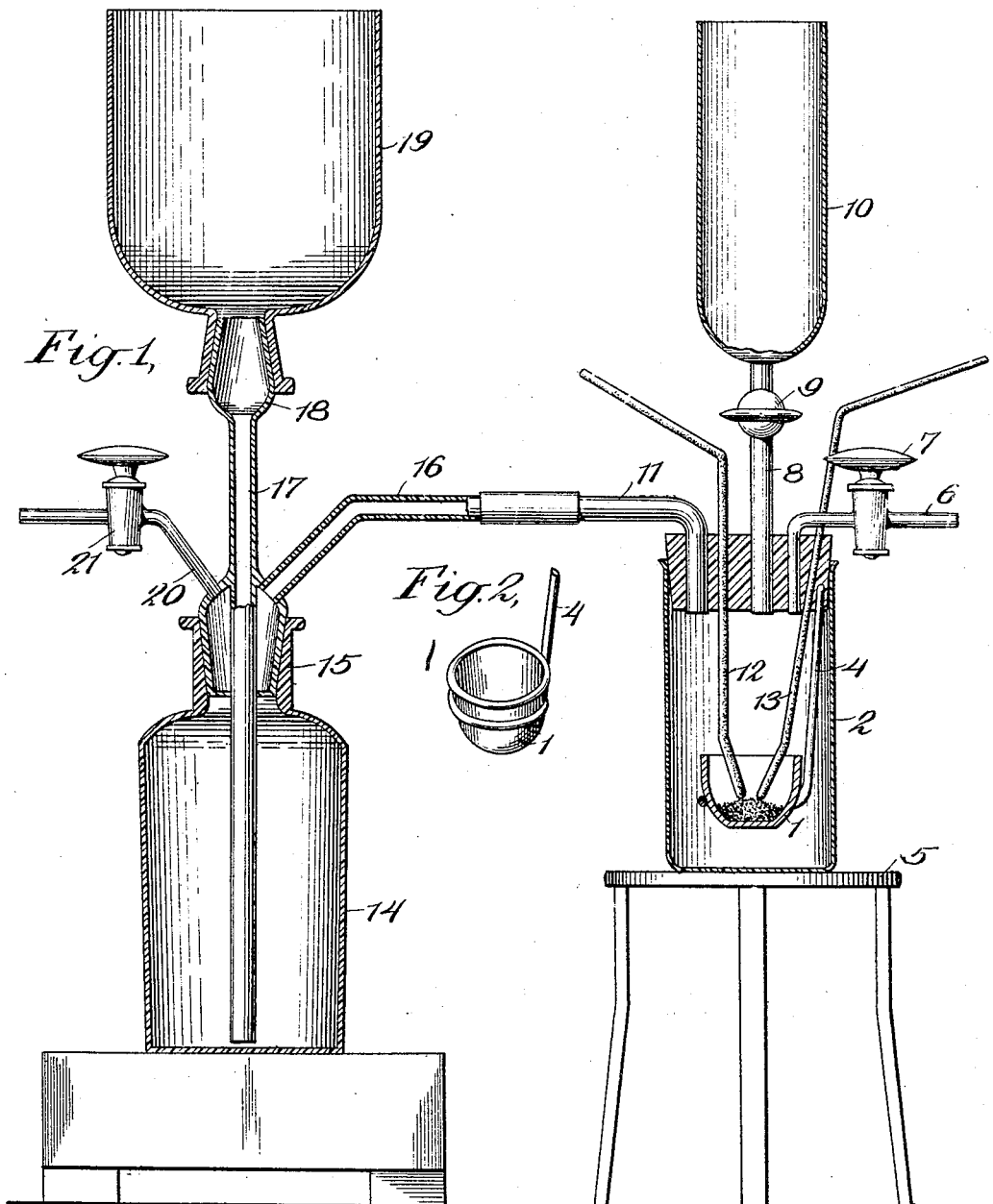
WITNESSES: INVENTOR
John O. Grimpler. George O. Seward
T. E. Raftery. BY
Kenyon & Kenyon
ATTORNEYS No. 773,529. Patented October 25, 1904.

UNITED STATES PATENT OFFICE.

GEORGE O. SEWARD, OF HOLCOMBS ROCK, VIRGINIA, ASSIGNOR TO EIMER & AMEND, OF NEW YORK, N. Y.

METHOD OF CARBON ANALYSIS.

SPECIFICATION forming part of Letters Patent No. 773,529, dated October 25, 1904.

Application filed February 25, 1903. Serial No. 145,007. (No specimens.)

*To all whom it may concern:*

Be it known that I, GEORGE O. SEWARD, a citizen of the United States, and a resident of Holcombs Rock, county of Bedford, State of Virginia, have invented a new and useful Improvement in Methods of Carbon Analysis, of which the following is a specification.

My invention relates to a method of determining the amount of carbon in a substance by means of an oxidizing agent; and it has for its object to separate the carbon contained in the substance by means of such an agent without the application of external heat.

The invention consists in mixing together the substance containing the carbon with the oxidizing agent, causing the mixture to be kindled, collecting the carbon dioxid formed by the reaction of the oxidizing agent and the carbon of the substance and weighing the carbon dioxid thus collected.

The invention also consists of the method of removing the last traces of the carbon dioxid formed by the chemical reaction between the oxidizing agent and the carbon of the substance with which the oxidizing agent is mixed by boiling the said mixture in sulfuric acid or other agencies and causing air to pass over or through the surface of the heated sulfuric acid, which surrounds and covers the mixture.

My invention also consists in other features and methods of operation set forth in the specification, illustrated in the drawings, and claimed in the claim.

The invention is illustrated in the accompanying drawings, in which—

Figure 1 illustrates the apparatus used for causing the production of the carbon dioxid or other gases, and Fig. 2 illustrates the nickel or other metallic crucible or basin adapted to hold the mixture of the substance containing carbon and the oxidizing agent.

1 illustrates a nickel crucible or basin in which is placed the mixture of the substance containing the carbon and the oxidizing agent. The crucible or dish is located in a closed beaker-shaped vessel 2, which has a stopper 3. The crucible or basin may be supported by means of a wire 4, attached to the stopper 3 and at a point considerably below the stopper 3.

The beaker 2 is supported by any convenient stand 5, preferably an iron stand, which will permit the beaker to be heated by a Bunsen flame in removing the last traces of the carbon dioxid which may be formed by the oxidizing agent acting upon the carbon. The interior of the beaker 2 is connected, by means of a tube 6, with a source of supply of purified air, oxygen, or other fluid. The tube 6 has a stopcock 7 for regulating the supply of air. The interior of the beaker 2 is also connected, by means of a tube 8, with a funnel 10, located at the upper end of the tube. The stop-cock 9, located in the tube 8, serves to completely shut off the communication between the funnel 10 and the beaker 2. An exit-tube 11 is also connected to the interior of the beaker 2, which permits the gases to pass from the beaker and to permit the exit of the carbon-dioxid gas as it is formed by the combination of the oxidizing agent and the carbon of the substance.

In order to raise the temperature of the mixture to a kindling-point, a means is provided for igniting the mixture. This may be done by means of an electrically-heated wire or in many other ways. The preferred method is by means of an arc or spark formed between the electric terminals 12 13, which are connected, through the stopper 3, to the interior of the metal dish 1. The terminals 12 and 13 are placed close together and on or under the surface of the mixture of the substance containing the carbon and the oxidizing agent. The terminals are sufficiently near together to permit a spark to pass between them or to permit a small arc to be formed on the surface of the mixture contained in the crucible or basin 1.

A means for regulating the flow of gas is also provided. This means also constitutes a safety device for preventing any accident which might occur because of a too rapid formation of the carbon dioxid. This means consists of a pressure-bottle 14, having a three-way stopper 15. One of the tubes 16 is connected to the tube 11, which leads to the interior of the beaker 2. The tube 17 passes down through the stopper 15 and bottle 14. The upper end terminates in a stopper 18. On the stopper 18 is supported a funnel or reservoir 19. The remaining tube 20 is an exit-tube and is provided with a stop-cock 21 for controlling the flow of gas passing through the pressure-bottle 14 and the tube 20. The tube 20 is connected with U-shaped drying-tubes (not shown) containing anhydrous copper sulfate and lumps of calcium chlorid or other drying agent. At the end of the drying-tubes are connected absorbing-bulbs (not shown) containing potassium hydroxid or other agents which take up the carbon dioxid as it passes into the bulbs.

When the apparatus is set up for separation and determination of the carbon in a substance, the parts are tightly connected in any one of the many ways known in laboratory-work. The ground-stoppers of the pressure-bottle or safety-flask 14-19 are secured and all of the communications are made tight. For analysis of carbon about one gram of the metal or other substance to be analyzed is thoroughly mixed with about ten grams of sodium peroxid or other oxidizing agent. The amount of the ingredients, however, may be varied according to the substances used or as desired. The mixture is placed in the crucible or basin, and the terminals are placed so that their ends make contact with the surface of the mixture contained in the nickel basin. The whole is then inserted in the beaker. The bottle 14 is filled with concentrated sulfuric acid so that the upper level of the sulfuric acid just covers the lower edge of the stopper 15. Stop-cocks 7 and 21 are now opened, and purified air is allowed to pass through the apparatus for a certain length of time, depending upon the circumstances of each case. It is ordinarily found that fifteen minutes is a sufficient time. The movement of the purified air carries all of the moisture and gaseous material foreign to the analysis through the drying-tubes and out of the apparatus. At the termination of this period the stop-cocks 7 and 21 are closed and the flow of purified air is stopped. At this point an electric current is allowed to pass through the terminals 12 13 and a small arc or spark is allowed to play upon or under the surface of the mixture. This heats the mixture and raises it to what may be termed the "kindling-point," whereupon the electric circuit may be opened and the flow of current cut off. If a platinum-wire is connected between the terminals 12 13, it will become heated by the current and cause the mixture to be raised to the necessary kindling-point. When the mixture is raised to the kindling-point, the oxidizing agent will immediately attack the carbon contained in the substance to be analyzed and will burn the carbon until practically none remains in the substance. The oxidation of the carbon by means of the oxidizing agent produces corbon dioxid at first comparatively slowly and afterward very rapidly. The carbon dioxid formed in the reaction passes from the beaker and enters the safety-flask 14. The sulfuric acid contained therein is forced downward, and when a sufficient pressure is reached the stop-cock 21 is opened and the gas is allowed to escape through the purifying and drying bulbs and tubes into the potassium-hydroxid bulbs, where the $CO_2$ is absorbed. As the gas increases in its rate of production it is regulated by means of the stop-cock 21. Upon the completion of the above steps water is allowed to fall from the funnel 10 and through the stop-cock 9 into the nickel crucible until the basin is nearly filled and the reduced mass contained in the crucible is completely covered. The funnel 10 is then filled with a cool mixture of concentrated sulfuric acid and water about in equal proportions. The stop-cock is again opened, and sufficient sulfuric acid runs in to render the solution in beaker 2 decidedly acid. The Bunsen burner or other heating device is placed under the stand 5 and the sulfuric acid in the beaker is boiled vigorously for a sufficient length of time to expel all $CO_2$ which may be in it, depending upon the circumstances of the case. It is found that ten minutes is an average length of time. Water is now placed in the funnel 10 and allowed to run into the beaker until liquid reaches nearly to the stopper 3. The stop-cock 7 is now opened and purified air is allowed to again pass through the apparatus to expel all the carbon dioxid. This removes the last traces of the carbon which has been reduced from the mass in the form of carbon dioxid. The potassium hydroxid contained in the bulbs for collecting the carbon dioxid is weighed before the gas is formed by the oxidation of the carbon contained in the substance to be analyzed and is then weighed after all of the carbon has been removed from the substance. The difference in weight is the amount of the carbon dioxid that has been formed, from which can easily be deducted the amount of carbon contained in the substance analyzed.

The method is of such a character that it does not require any platinum dishes or platinum stoppers in order to produce the analysis. Moreover, the oxidation may take place at a point remote from any stopper which may be made of rubber or other carbonaceous material, and thereby avoid any combination between the oxygen of the oxidizing agent and the carbon of the stopper. The only carbon which is thus collected by the potassium hydroxid in the bulbs is obtained from the substance analyzed and not from any part of the apparatus. A further advantage in the method is the simplicity and the quickness with which the analysis is made, as well as the accuracy of the results which are obtained therefrom. The reaction is obtained without the application of external heat. Heat may be used for removing the last traces of carbon dioxid, but the reduction itself is produced without any external heat. If external heat is used in the reduction of the carbon, such external heat is apt to heat the stoppers, and if the stoppers are of rubber, or if other carbonaceous sealing substances are used, the carbon is liberated and collected in the potassium hydroxid, which produces an error in the analysis.

The above method is useful in the determination of carbon in any and all substances; but it is found to be especially useful in the determination of carbon in metals—such as ferrochrom, steels, &c. The oxidizing agents generally used are sodium peroxid, barium peroxid, calcium peroxid, lead peroxid, potassium chlorid, ammonium persulfate, lead bichromate, and other substances having the property of combustion without requiring oxygen from the air. For the determination of carbon in metals it is found preferable to use sodium peroxid.

The apparatus used to carry out the method above set forth may be greatly varied without in any way departing from the spirit of the invention. The steps of the method may also be modified likewise without departing from the spirit of the invention.

What I claim as new, and desire to secure by Letters Patent, is as follows:

The method of determining the amount of carbon contained in a substance consisting in mixing the said substance with an oxidizing agent, and confining said mixture, causing an electric arc to raise a portion of the mixture to a kindling temperature, causing carbon dioxid formed by the reaction to pass through potassium hydroxid or other absorbing agent thereby collecting the said carbon dioxid, covering the residual mixture with diluted sulfuric acid, boiling the said acid and then causing purified air to pass over the surface of and through the sulfuric acid containing the said residual mixture, and over the said potassium hydroxid and weighing the said potassium hydroxid.

In testimony whereof I have signed my name to this specification in the presence of two subscribing witnesses.

GEO. O. SEWARD.

Witnesses:
W. P. CARTER,
GEO. T. LANCASTER.